Oct. 9, 1945.   L. P. EVANS   2,386,670
METHOD AND APPARATUS FOR CONTACTING GASES WITH A SOLID MATERIAL
Filed June 21, 1944
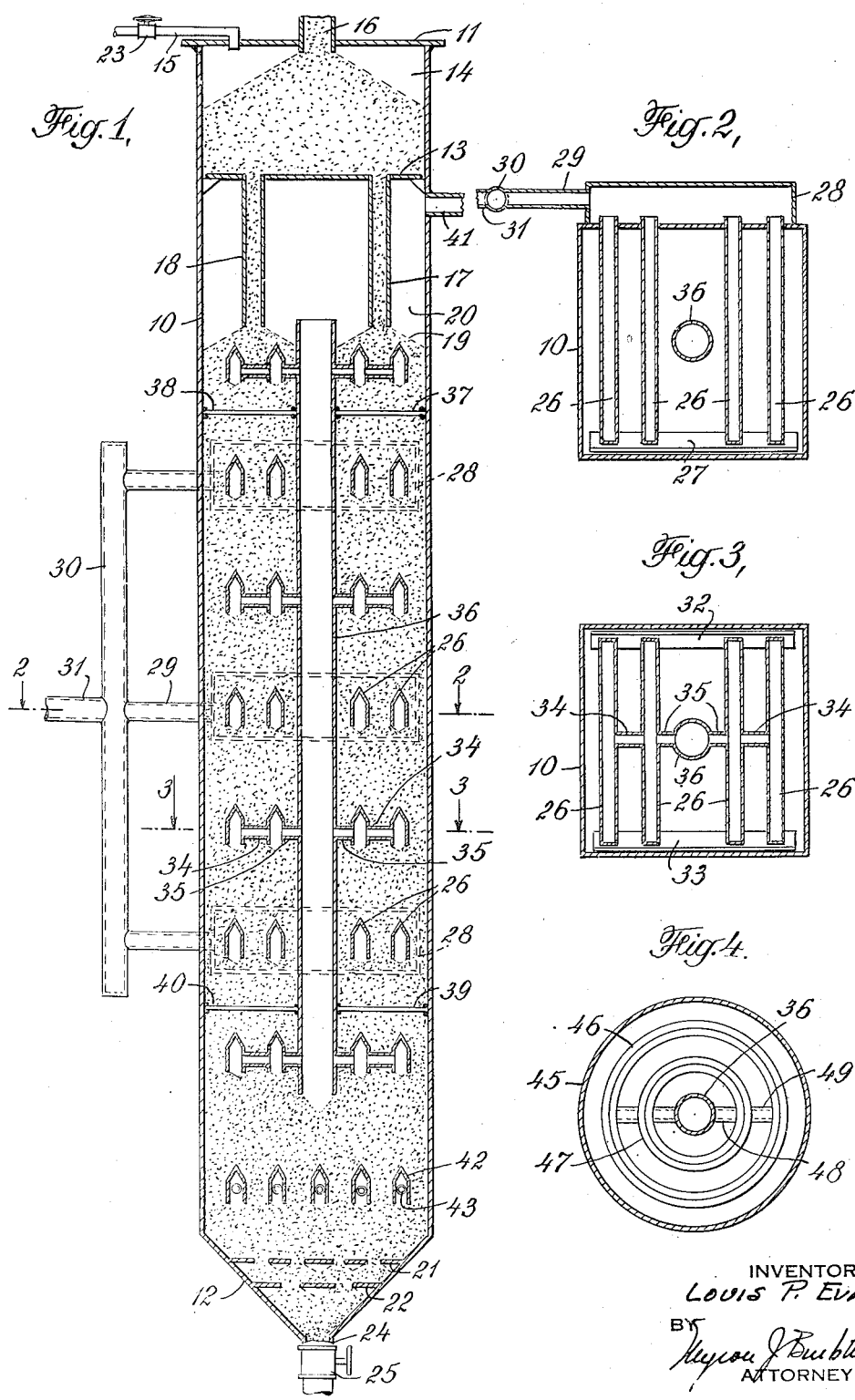
INVENTOR
LOUIS P. EVANS
BY
ATTORNEY Patented Oct. 9, 1945

2,386,670

UNITED STATES PATENT OFFICE 2,386,670

METHOD AND APPARATUS FOR CONTACTING GASES WITH A SOLID MATERIAL

Louis P. Evans, Woodbury, N. J., assignor to Socony-Vacuum Oil Company, Incorporated, a corporation of New York Application June 21, 1944, Serial No. 541,426

12 Claims. (Cl. 196—52)

This invention has to do with a method and apparatus wherein gases are contacted with moving particle form solid materials for any of a number of purposes such as gas adsorption gas-solid heat exchange, solid treatment, gas treatment or gaseous conversion. In processes involving gaseous conversion the solid material may be catalytic in nature; such processes have become increasingly important in the petroleum industry. Exemplary of such catalytic processes are the catalytic cracking conversion, dehydrogenation, hydrogenation, isomerization, alkylation, reforming, polymerization, desulphurization and oxidation of hydrocarbon fractions. Typical is the cracking conversion of hydrocarbon gas oils, it being well known that gas oils boiling in the range of 450° F. to 750° F. may be converted to gasoline and other products when contacted with a particle form solid contact mass material at controlled conditions of temperature such as 800° F. and higher and pressure such as atmospheric and higher. The solid contact mass material for this process may partake of the nature of natural or treated clays or synthetic associations of silica, alumina, or silica and alumina, which may contain certain added constituents such as certain metallic oxides. Recently the process has taken the form of one wherein the particle form solid material is cyclically passed as a substantially compact column through two vessels, in one of which it is contacted with hydrocarbon gases for the purpose of their conversion and in the other of which it is contacted with a combustion supporting gas for the purpose of burning from the solid material a contaminant material deposited thereon during the conversion step.

This invention is specifically directed to a method of operation and apparatus construction for handling the gas flow in a conversion vessel in such a cyclic process as above described.

Proper utilization of contact masses in such processes requires a rather complete diffusion of gaseous reactants into the contact mass. It also requires the capability of passing comparatively large volumes of gaseous reactants through the apparatus without undue pressure drop. It has been found that much higher gas throughputs are permissible when the gas is passed in parallel through a number of relatively short vertical sections of a column of downwardly flowing particle form solid material rather than when the gas is passed lengthwise through the entire column. A disadvantage of this multistage gas flow type of operation arises, however, in the necessity for devoting considerable space in each stage for the disengagement of effluent gases from solid material in order to prevent excessive entrainment thereof from the conversion vessel. Inasmuch as only one such disengaging or solid settling space is required in single stage convertors, it will be apparent that the total percentage of catalyst containing space in a single stage convertor is substantially greater than that in the multistage convertor. In other words the volumetric efficiency of the single stage convertor is substantially greater than that of the multistage type. Moreover, the total amount of solid material entrainment in the effluent gases from the multistage convertor may in many instances be greater than that in the single stage convertor.

A major object of this invention is the provision of a method of operation and apparatus construction which will permit the multistage contacting of gas with a moving column of particle form solid material while eliminating the above described disadvantages of the multistage type operation.

Another object of this invention is the provision of an apparatus for conversion of hydrocarbon gases in the presence of a moving column of particle form solid contact mass material which apparatus is simple and economical of construction and will permit high volumetric rates of gas throughput without excessive entrainment of the solid material in the effluent gas. These and other objects of this invention will become apparent from the following description of the method and apparatus of this invention.

Before entering into a description of the invention, attention should be given to several terms which are used both in the claiming and description of this invention. One of such terms is the term "gas" which term is herein intended as covering material in the gaseous state at the temperature of the operation involved regardless of the normal state of such material at atmospheric conditions. Other terms are the terms "solid-gas disengaging space" or "solid gas disengaging zone" or "solid settling space" which are used herein synonymously to denote a space from which the flow of solid material other than that entrained in the gas is excluded, which space is of sufficient size to permit substantial settling of the entrained solid material from the gas stream flowing therethrough.

For a better understanding of this invention, reference should now be made to the figures attached hereto, of which Figure 1 is an elevational view, partially in section, of a conversion vessel constructed according to this invention, Figure 2, is a plan view, partially in section, taken at line 2—2 in Figure 1. Figure 3 is a plan view, partially in section, taken at line 3—3 in Figure 1 and Figure 4 is a plan view, partially in section, of a modified form of conversion vessel. All of these figures are highly diagrammatic in character.

Turning now to Figure 1, we find the shell 10 of a vertical vessel, having a closed top 11, and a closed tapered drain section 12. A partition 13 is positioned across the upper section of the shell defining a seal zone 14 within the upper end thereof. An inlet pipe 15 having a diaphragm operated valve 23 thereon is connected into the top 11 for admittance of seal gas into the seal zone. A conduit 16 is connected into the top 11 for introduction of solid material into said seal zone. A number of uniformly distributed pipes such as 17 and 18 depend from the partition 13 for passage of the solid material onto the surface 19 of the solid material column maintained in the conversion vessel. The arrangement thereby provides a solid-gas disengaging space 20 above the column of solid material, the length of which space is determined by the length of the pipes 17 and 18. A gas outlet conduit 41 is provided near the upper end of the disengaging space. A plurality of partitions or baffles such as 21 and 22 are positioned in the drain section 12. Proportionately distributed orifices are provided in these partitions so as to divide the solid material flow into a plurality of streams which are gradually and proportionately recombined into a final single outlet stream which passes from the drain section through a drain conduit 24 provided at the lower end of the drain section. The baffles 21 and 22 thus act to insure uniform downward flow of the solid material across the entire vessel cross-section thereabove. Other types of baffles which are so constructed and positioned as to accomplish the same purpose may be substituted for the baffles 21 and 22 or the solid material may be withdrawn from the bottom of the conversion vessel through a number of uniformly distributed drain conduits. A throttle valve 25 is provided in the drain conduit 24 to permit control of the rate of solid withdrawal so as to maintain a substantially compact column of solid material within the vessel below the lower ends of the solid material passage pipes 17 and 18. Positioned at vertical intervals within that part of the vessel below the disengaging zone are a plurality of rows of horizontally extending inverted angle topped troughs. These troughs in each row are horizontally spaced apart and extend lengthwise across the vessel cross-section. Certain alternate rows of these troughs, such as 26, are inlet distributor troughs and their structure and positioning may be better understood by reference to the plan view in Figure 2 in conjunction with Figure 1. It will be seen that the distributor troughs are supported on one end from the shell of the convertor by a suitable support member 27 shown in Figure 2. The opposite ends of the troughs in each row extend through the shell into an inlet manifold box 28 to which gas is supplied from inlet pipe 29 which, in turn, connects into inlet riser manifold 30 which is in turn supplied through the main inlet conduit 31. Other suitable means for introducing gas to the several rows of gas distributor troughs may be alternatively provided. The remaining alternate rows of troughs are collector troughs and these may be better understood by reference to the plan view shown in Figure 3 in conjunction with Figure 1. These troughs are supported on their opposite ends from the vessel shell by suitable support members 32 and 33. Short spool pieces such as 34 and 35 connects through the sides of the troughs, the spool 35 also connecting on one end into a vertical gas collector conduit so as to provide a solid material excluded passage for gas flow from under the troughs into the collector conduit 36. The collector conduit 36 is substantially centrally located within the vessel and supported by bar members, such as 37-40 inclusive, and terminates on its upper end in the lower section of the disengaging zone 20 and on its lower end below the lowermost rows of collector troughs. Several of said collector pipes may be provided in vessels of large cross-section, each pipe serving certain rows of collector troughs or certain collector troughs in each row thereof. In the modification wherein different collector conduits are used for different rows of collector troughs, it will be apparent that the collector conduits extending downwardly from the disengaging space may vary in length. The distributor and collector troughs may take forms other than those specifically shown, and the gas distributors may differ in construction from the gas collectors. In any case, they should be such as to provide vertically spaced rows of gas spaces from which solid material flow is substantially excluded, which spaces are in free gaseous communication with the column of solid material in the conversion vessel. A row of distributor troughs 42 is provided in the lower end of the vessel above the drain section for distribution of a purge gas into the column of solid material. Gas inlet pipes 43 are provided under these troughs for introduction of purge gas.

In operation particle form solid contact mass material passes to the seal zone 14 through conduit 16, which is of sufficient length to provide a head of solid material therein sufficient to permit solid material flow into the seal zone against the gaseous pressure maintained therein. Other means of admitting solid material into the seal zone may be alternatively provided such as a system of locks or a positive feed device such as a screw conveyor. A bed of solid material is maintained in the seal zone and solid material passes from the bottom of said bed through the pipes 17 and 18 to the surface of the column of solid material maintained in the reaction section of the vessel. The solid material then passes through the series of superimposed reaction stages provided as a substantially compact column; it then passes through the short purging section and finally passes from the vessel through conduit 24. The rate of the solid material flow is controlled by valve 25 in conduit 24 so as to provide the desired solid material contact time with the reactant gas in the several reaction stages. Preferably the solid material flow should be continuous, although intermittent flow may be maintained, if desired, for certain operations. The solid material drained from the conversion vessel is then conducted through a suitable regenerator wherein contaminant material deposited during the gaseous conversion may be removed. The regenerated solid material may then be cycled back to the top of the conversion vessel. Reactant material, such as hydrocarbons, may be heated to the proper reaction temperature in an external apparatus (not shown) which may be of conventional design, and the gaseous reactants may then be introduced through conduit 31 into the vertical manifold 30 from which the gas passes into the several rows of distributor troughs by way of the several inlet pipes 29 and manifold boxes 28. The gas then passes from under the open bottoms of the distributor troughs 26 into the column of solid material, the gas flow from each row of troughs, then splitting, part passing upwardly through the solid material to the nearest row of gas collecting troughs thereabove and part passing downwardly through the solid material to the nearest row of collector troughs therebelow. The gas flow may be said to be in parallel through a series of superimposed reaction stages, the flow being in a substantially vertical direction through the solid material in each stage and opposite in direction in adjacent stages. It will be seen that adjacent stages thus share common rows of gas inlet troughs and rows of gas outlet troughs. The gaseous reactant products collected under the several rows of gas collector troughs then pass from these troughs by way of spool pieces 34 and 35 into the vertical gas collector conduit 26. Any solid material entrained in the effluent gas which is of sufficient diameter to settle against the gas flow in the collector conduit passes from the open lower end of the conduit 36 back into the column of solid material. The effluent gas and the smaller entrained particles of solid material pass upwardly through the conduit 36 and discharge into the lower end of the disengaging space 20. The cross-section of this space being substantially greater than that of the collector conduit permits a sudden reduction in the upward rate of gas flow thereby permitting a substantial portion of the entrained solid material to settle to the surface 19 of the column of solid material. The effluent reaction gas containing small quantities of undersized solid material is withdrawn from the upper section of the disengaging space 20 through outlet conduit 41. Any remaining entrained fine material may then be separated from the gas in a suitable separator (not shown), if desired, and then the gas is conducted to a suitable product recovery system (not shown). An inert purge gas, such as steam or flue gas is introduced through pipes 43 under the troughs 42 just above the solid material drain section. This gas then passes upwardly through the column of solid material, purging gaseous reactant therefrom, and passes under the lowermost row of collector troughs along with gaseous reaction products. The length of the drain conduit 24 above the throttle valve 25 thereon generally should be sufficient to limit the amount of purge gas passing from the vessel along with the solid material. An inert seal gas is introduced through pipe 15 into the seal zone 14 and the quantity of such gas so introduced is controlled by diaphragm valve 23 which is operated by a suitable differential pressure control instrument so as to maintain a seal gas pressure in the seal zone slightly above that in the disengaging space 20, thereby preventing the loss of reactant gases through the solid material inlet conduit 16.

The apparatus shown in Figure 1 is specifically adapted for conducting gaseous conversion under pressure in the presence of a moving particle form solid contact mass material, especially when the loss of substantial quantities of such conversion gases through the solid material inlet or outlet is objectionable. In other operations, such as low pressure contacting operations or operations wherein the escape of part of the gas into the atmosphere is not objectionable, the means for purging the solid material and/or the seal chamber 14 may be eliminated. In such instances the partition 13 may be omitted, the lower end of conduit 16 closed and pipes 17 and 18 connected into said closed end of inlet conduit 16 as a Y connection, for example, thereby providing a passage for inlet solid material through the solid-gas disengaging space.

Some variation in the construction of the shell of the conversion vessel is possible. Thus the shell 10 may be of other than the square cross-sectional shape shown in Figures 2 and 3; for other cross-sectional shapes, the gas distributor and collector troughs may be adjusted in their lengths to fit the cross-section or the lengthwise shape of the troughs may be modified to better suit the particular cross-sectional shape involved. Figure 4 is a plan view, partially in section, looking down on a row of modified collector troughs. In this figure, 45 represents the circular shell of a conversion vessel, 36 is a centrally located vertical collector conduit, 46 and 47 two ring shaped collector troughs and 48 and 49 are spool pieces providing gas passageway between the underside of said troughs and the interior of the collector conduit. In this modification, the collector troughs are similar to those shown in Figure 1, except that instead of extending straight across the vessel cross-section in their lengthwise dimension, they take the form of horizontally positioned rings. As regards the vertical construction of the conversion vessel, it will be apparent that it may be constructed in superimposed sections flanged together, as well as in one single continuous shell and such sectional construction would be preferable when the total length of the vessel is great.

The alternate arrangement of the vertically spaced rows of distributor and collector troughs shown in Figure 1 is a preferred embodiment of this invention. Other arrangements, however, are possible and in some instances desirable. Thus, for example, the arrangement of the rows of distributor and collector troughs may be such as to provide a series of superimposed reaction stages each having an individual row of distributor troughs adjacent one end thereof and an individual row of collector troughs adjacent the opposite end thereof. In such a modification, the gas flow may be upwards or downwards through each stage or it may be upwards in some stages and downwards in others.

The design dimensions of the apparatus of this invention will vary dependent upon the process to which it is applied and the materials involved therein. Thus the vertical spacing distance between the rows of distributor and collector troughs will depend upon the desired reactant gas space velocity measured with respect to the volume of catalyst in the stage through which the gas passes. In some operations lower gas space velocities may be desirable in the lower stages to compensate for the gradual loss in catalyst activity. In such event the spacings between inlet and outlet troughs may be greater in the lower section of the vessel than in the upper section thereof. The spacing distance is, of course, limited by the maximum allowable rate of gas flow through the solid material column without serious disruption of the flow of said column, that is, for a given fixed desired space velocity, the distance between rows of distributor and collector troughs must be limited so that the required linear gas velocity is below the maximum allowable. These limiting velocities in turn depend on the nature of the solid material particles and gas involved and may be easily determined by methods known to those skilled in the art for any given set of materials. In general, in hydrocarbon conversion operations involving solid materials of a size range varying from 4 to 60 mesh, it has been found that spacings between adjacent rows of gas distributor and collector troughs of the order of 6" to 5' are satisfactory. The number of stages required is also dependent upon the particular application and the desirable time for solid material contact with the conversion gases. Solid material linear rates of flow of the order of 0.5 to 10.0 feet per minute through the reaction stages have been found feasible in hydrocarbon conversion operations; and for such operations from 2–20 reaction stages may be employed. The cross-section of the gas collector conduit should be sufficient to limit the pressure drop due to gas flow therethrough below that which would cause a substantial upward flow of gas from stage to stage through the solid material column in the vessel. Once the total gas rate for a particular application is determined, the proper size of the gas collector conduit or conduits may be easily calculated. The cross-section of the disengaging space should be sufficient to limit the gas velocity therethrough below that which would entrain substantial quantities of solid material particles of a size which should be desirably retained in the solid material flow system. In hydrocarbon conversion operations involving a clay catalyst having a density of about 40 pounds per cubic foot and a particle size ranging between 8–30 mesh, satisfactory solid settling is obtained in disengaging spaces having sufficient cross-section to limit the upward rate of gas flow therethrough to about 2 to 5 feet per second. In such operations the disengaging space may be between about 2 to 10 feet in height. In operations wherein a large number of stages are used, it is desirable to provide a disengaging space of somewhat larger cross-section than the remainder of the conversion vessel in order to permit proper settling of the solid material.

It will be apparent from the above description that this invention provides a method of operation and an apparatus wherein relatively large volumes of gas may be forced through a substantially compact column of moving particle form solid contact mass material, by virtue of a multistage type of gas flow, while at the same time the necessity for a plurality of separate gas-solid disengaging zones and a plurality of gas outlets, characteristic of operations involving such multistage type of gas flow, has been entirely eliminated. Thus a reaction vessel is provided having both the high gas throughput capacity of multistage reactors and the high solid material volumetric efficiency and the simplicity of outlet gas manifolding, characteristic of the single stage reactors.

It should be understood that the hereinabove description of this invention and the examples of its modifications and applications are merely exemplary in character and are in no way intended to limit the scope of this invention except as it is limited in the following claims.

I claim:

1. An apparatus for contacting gases with a particle form solid material comprising: means defining an elongated, closed upright vessel, means to introduce particle form solid material into said vessel at a level below the upper end thereof at a rate sufficient to provide a substantially compact column of solid material within said vessel below the inlet level, thereby providing a gas disengaging zone, within the upper section of said vessel above said level of solid introduction, means to withdraw solid material from the lower end of said vessel, at least one gas collecting conduit within said vessel extending upwardly therewithin below said disengaging zone and terminating within the lower section of said disengaging zone, means to introduce gas into said solid material column at a plurality of vertically spaced levels within said vessel, a plurality of rows of gas collecting members vertically spaced from said gas introduction means so as to provide a plurality of superimposed zones for substantially vertical gas flow through said column between said gas introduction means and said gas collecting members, gas passage defining means between each gas collector trough and at least one gas collector conduit, gas outlet means from said vessel adjacent the upper end of said disengaging zone.

2. An apparatus for contacting gases with a particle form solid material comprising: means defining an elongated upright enclosed vessel, at least one pipe for introduction of solid material extending downwardly into said vessel to a location substantially below the upper end of said vessel, thereby providing a substantially solid material free gas space for gas-solid disengagement within the upper section of said vessel, means to withdraw solid material from the lower end of said vessel, throttling means associated with said withdrawal means to permit control of the rate of solid withdrawal so as to maintain a substantially compact column of said particle form solid material within said vessel below the level of its introduction, means to introduce gas to said column in said vessel at a plurality of vertically spaced levels along said vessel, a plurality of vertically spaced rows of gas collecting members within said vessel vertically spaced from said means of gas introduction, at least one substantially vertical conduit extending through a major portion of said vessel, said conduit terminating short of the lower end of said vessel on one end and above the level of solid introduction on the other end, means defining substantially solid material free gas passageways from said gas collecting members to at least one vertical conduit at the level of each row of gas collecting members, gas outlet means from said vessel adjacent the upper end of said gas-solid disengaging space.

3. An apparatus for conducting gaseous conversion reactions in the presence of a particle form solid contact mass material comprising a closed elongated substantially vertical vessel, means to introduce particle form solid material into said vessel at a level below the upper end thereof at a rate sufficient to provide a substantially compact column of said solid material within said vessel below the inlet level, thereby providing a substantially solid material free gas disengaging space within the upper section of said vessel, means to uniformly withdraw solid material from the lower end of said vessel at a controlled rate, at least one gas collecting conduit extending through a substantial portion of the length of said vessel and terminating above the level of solid material introduction, a plurality of vertically spaced rows of horizontally extending inverted troughs positioned within said vessel below the level of solid material introduction, means to introduce reactant gas under the troughs of certain of said rows, gas passage defining means connected between the troughs of the remaining rows and at least one gas collecting conduit, gas outlet means from said vessel adjacent the upper end of said gas disengaging space.

4. An apparatus according to claim 3 characterized in that said means to introduce reactant gas under the troughs of certain of said rows are provided for alternate rows of troughs and said gas passage defining means connected between troughs and at least one gas collector conduit are provided for the troughs in the remaining alternate rows.

5. A gas solid contact apparatus comprising a substantially vertical shell closed on either end, means to deliver particle form solid material into said shell below the upper end thereof, thereby providing a gas zone within the upper section of said shell, means to withdraw said solid from the lower section of said shell at a controlled rate so as to provide a substantially compact column of downwardly moving particle form solid material within said vessel below said gas space, at least one gas collecting conduit extending vertically through a major length of said shell and terminating within the lower section of said gas space, a plurality of vertically spaced rows of horizontally extending gas distributing and gas collecting troughs within said shell, so arranged as to provide a series of superimposed contact zones, each having individual rows of gas distributing and gas collecting troughs, means to introduce gas under said rows of gas distributing troughs, pipes connecting said gas collecting troughs in each row thereof to at least one gas collecting conduit, gas outlet means from said shell adjacent the upper end of said gas zone.

6. An apparatus for conducting gasiform reactions in the presence of a moving particle form solid material comprising: a substantially vertical shell closed on either end, a partition across said shell within the upper section thereof defining a seal zone within the upper end of said shell, means to admit an inert seal gas into said seal zone, means to introduce particle form solid material to said seal zone against the inert gaseous pressure therein, uniformly distributed pipes dependent from said partition and terminating a set distance therebelow so as to provide a gas space from which the flow of inlet solid material is excluded, within the upper section of said shell directly below said seal zone, said space being a gas-solid disengaging space for the effluent gas, means to withdraw said solid material uniformly from the lower end of said shell, throttling means associated therewith to permit maintenance of a substantially compact column of solid material within said shell, means to admit a purge gas to said shell shortly above its lower end, a substantially centrally positioned gas collecting conduit extending through said shell and terminating within the lower section of said disengaging space on its upper end and above the lower end of said shell on its lower end, a plurality of vertically spaced rows of horizontally extending inverted troughs within said shell below said gas disengaging space, means to introduce reactant gas under the troughs of alternate rows, pipes connecting the troughs in the remaining alternate rows with the interior of said gas collecting conduit, at least one gas outlet pipe from said shell adjacent the upper end of said gas disengaging space.

7. A method for contacting gases with a particle form solid material comprising: passing said particle form solid material through a series of superimposed contact zones as a substantially compact column of downwardly flowing solid material, while providing a substantially solid material free solid settling zone directly above the surface of said column of solid material, passing a contacting gas through each of said contact zones in a substantially vertical direction, conducting the contact gas from said zones through at least one confined passage from which solid material is excluded into the lower section of said solid settling zone so as to permit entrained solid material to settle to the surface of said column of solid material, and withdrawing the contact gas from the upper section of said solid settling zone.

8. A method for contacting gases with moving particle form solid contact mass material comprising: maintaining a substantially compact confined column of downwardly flowing particle form solid contact mass material, supplying said solid material to the top of said column through confined passages so as to provide a substantially solid material free confined gas-solid disengaging zone directly over the surface of said column, withdrawing solid material uniformly from the lower end of said column, distributing gas into said column at a plurality of vertically spaced levels along its length, collecting said gas at a plurality of vertically spaced rows of baffle-formed gas spaces located within said column at levels intermediate said levels of gas distribution, conducting gas from said rows of baffle formed gas spaces through confined passages into at least one solid material excluded passageway extending vertically through said column and terminating within the lower section of said gas-solid disengaging zone and withdrawing the contact gas from the upper section of said disengaging zone.

9. In a catalytic hydrocarbon conversion system comprising a substantially vertical reaction vessel having a confined seal chamber within its upper end, an intermediate reaction section and a drain section at its lower end, the method of effecting continuous operation comprising introducing particle form solid catalytic material into said seal chamber so as to maintain a bed thereof therein, conducting said solid material through confined substantially vertical passages from said seal chamber to the surface of a substantially compact column of said material maintained within said reaction vessel a set distance below said seal chamber, thereby providing a substantially solid material free gas-solid disengaging zone above said column and below said seal chamber, uniformly withdrawing solid material from the lower end of said column, introducing hydrocarbon gases into said column at a plurality of vertically spaced rows of horizontally extending, spaced gas spaces, said gas spaces being in free gaseous communication with said column, collecting gaseous reaction products at a second plurality of rows of horizontally extending, spaced, gas spaces located within said column at levels intermediate said first-named rows of gas spaces conducting the gaseous reaction products from said second-named gas spaces through confined passages into at least one confined solid material excluded passageway extending through said column in said intermediate reaction section and terminating in the lower section of said gas-solid disengaging space, passing the gas upwardly through said disengaging space so as to permit settling of entrained solid material particles, withdrawing vapor reaction products from the upper section of said disengaging zone; and at the same time introducing an inert purge gas to said column of solid material shortly above said drain section and maintaining an inert seal gas pressure in said seal chamber above the gaseous pressure in said disengaging zone.

10. A method for contacting gases with a moving particle form solid contact mass material which comprises: passing said solid material as a substantially compact column downwardly through a series of superimposed contacting zones, adjacent zones sharing in common a row of gas inlet distributors and a row of gas outlet collectors, introducing contact gas under controlled conditions of temperature and pressure to said rows of gas inlet distributors and passing the gas therefrom in substantially vertical directions through said column of solid material to the vertically spaced adjacent rows of gas outlet collectors, conducting the gas from said outlet collectors through confined passages into at least one centrally located confined stream of outlet gas passing vertically upward through said column of solid material into the lower section of a confined gas space maintained above said column of solid material, thereby permitting solid material particles entrained in the effluent gas to settle therefrom onto the surface of said column, withdrawing the gas from the upper section of said gas space.

11. A method for conducting gaseous conversions in the presence of a moving particle form solid contact mass material comprising: maintaining a substantially compact confined column of particle form solid contact mass and maintaining at a vertical distance thereabove a confined accumulation of said solid material, maintaining an inert gaseous pressure above said confined accumulation, continuously replenishing said accumulations with solid material and continuously passing solid material from said accumulation through confined passages to the surface of said column, thereby providing a solid material settling zone between said accumulation and the surface of said column, uniformly withdrawing solid material from the lower end of said column at a controlled rate, passing reactant gas in parallel vertically through a plurality of superimposed vertically extending sections of said column and collecting gaseous reaction products from each section in an independent row of gas collecting spaces extending across said column within each of said sections passing the gas from said gas collector spaces through confined passages into at least one centrally located confined stream of outlet gas passing vertically upward through said column of solid material into the lower section of said solid material settling zone, passing the gas upwardly through said settling zone so as to permit settling of entrained solid particles to the surface of said column, withdrawing the effluent reactant gas from the upper section of said settling zone; and at the same time admitting an inert purge gas to the lower section of said column below the lowermost reaction stage.

12. A method for contacting gases with a particle form solid material comprising: passing said particle form solid material through a series of superimposed contact zones as a substantially compact column of downwardly flowing solid material, while providing a substantially solid material free solid settling zone directly above the surface of said column of solid material, passing a contacting gas through each of said contact zones in a substantially vertical direction, conducting the contact gas from said zones through at least one confined passage from which solid material is substantially excluded upwardly through said column into the lower section of said solid settling zone above the surface of said column of solid material, and withdrawing the contact gas from the upper section of said solid settling zone.

LOUIS P. EVANS.